US009897141B2

(12) United States Patent
Kuwabara et al.

(10) Patent No.: US 9,897,141 B2
(45) Date of Patent: Feb. 20, 2018

(54) CURVILINEAR MOTION ROLLING GUIDE UNIT

(71) Applicant: NIPPON THOMPSON CO., LTD., Tokyo (JP)

(72) Inventors: Hideki Kuwabara, Tokyo (JP); Masaharu Yoshida, Tokyo (JP); Takaaki Tsuboi, Tokyo (JP); Katsuaki Nakano, Tokyo (JP); Akitomo Mine, Tokyo (JP)

(73) Assignee: NIPPON THOMPSON CO., LTD, Tokyo (JP)

( * ) Notice: Subject to any disclaimer, the term of this patent is extended or adjusted under 35 U.S.C. 154(b) by 0 days.

(21) Appl. No.: 15/350,370

(22) Filed: Nov. 14, 2016

(65) Prior Publication Data
US 2017/0130771 A1    May 11, 2017

(30) Foreign Application Priority Data

Nov. 11, 2015   (JP) .................................. 2015-221521

(51) Int. Cl.
*F16C 29/06* (2006.01)
*F16C 19/50* (2006.01)
*F16C 33/66* (2006.01)
*F16C 43/04* (2006.01)

(52) U.S. Cl.
CPC ........ *F16C 29/0611* (2013.01); *F16C 19/502* (2013.01); *F16C 29/0654* (2013.01); *F16C 29/0657* (2013.01); *F16C 33/6648* (2013.01); *F16C 43/04* (2013.01); *F16C 29/0609* (2013.01); *F16C 2202/50* (2013.01); *F16C 2220/20* (2013.01); *F16C 2226/70* (2013.01); *F16C 2226/74* (2013.01)

(58) Field of Classification Search
CPC .............. F16C 29/0611; F16C 29/0654; F16C 29/0657; F16C 26/0609
See application file for complete search history.

(56) References Cited

U.S. PATENT DOCUMENTS

| 6,547,437 B2* | 4/2003 | Kamimura ............ F16C 29/064 384/13 |
| 8,783,951 B2* | 7/2014 | Kondo ................ F16C 33/6648 384/45 |
| 2014/0153849 A1* | 6/2014 | Mizumura ............. F16C 43/06 384/43 |

FOREIGN PATENT DOCUMENTS

| JP | 62101914 A | 5/1987 |
| JP | 2001241437 A | 9/2001 |
| JP | 2013015189 A | 1/2013 |

(Continued)

*Primary Examiner* — Thomas R Hannon
(74) *Attorney, Agent, or Firm* — Browdy and Neimark, PLLC

(57) ABSTRACT

A curvilinear motion rolling guide unit is such that pipe members adapted to form return passages are disposed respectively at undercuts of wings of an arcuate casing, thereby reducing working costs. A slider has a casing and end caps fixed to respective opposite ends of the casing. Pipe members adapted to form return passages are disposed at the respective undercuts formed on the wings of the casing. Cover members have longitudinally extending grooves, respectively, for covering the pipe members. Fitting grooves formed at opposite ends of the grooves of the cover members are fitted to direction changing passages provided in the respective end caps, whereby the cover members are fixed to the end caps.

9 Claims, 16 Drawing Sheets

(56) References Cited

FOREIGN PATENT DOCUMENTS

JP 2013029116 A 2/2013

* cited by examiner

CURVILINEAR MOTION ROLLING GUIDE UNIT

FIELD OF THE INVENTION

The present invention relates to a curvilinear motion rolling guide unit composed of an elongated arcuately curvilinear raceway rail, and an arcuate slider which moves on the raceway rail in a relative manner through rolling elements.

BACKGROUND OF THE INVENTION

In recent years, the application of a curvilinear motion rolling guide unit to sliding sections of various apparatus, such as curvilinear reciprocating motion mechanisms or the like of industrial robots, for example, has been expanding. Usually, for smooth rolling of rolling elements on a circulation passage and for good lubrication to the rolling elements, lubricant is periodically supplied from a lubrication port. However, in view of energy savings, implementation of simple structure and low cost for the apparatus, and a reduction of running cost and equipment maintenance cost, the apparatus has been required to be of maintenance-free design. In this connection, curvilinear motion rolling guide units incorporated in the apparatus have been greatly desired to implement maintenance-free design in which lubricant is not supplied in use, or to minimize the amount of use of lubricant.

Conventionally, Japanese Patent Application Laid-Open No. S62-101914, for example, discloses a swing bearing, as a curvilinear motion rolling guide unit, used to support various swing sections of industrial robots, for example. The swing bearing is composed of a raceway member having loaded-ball grooves formed in inner and outer curved surfaces, respectively, each having a fixed radius of curvature; a bearing body having loaded-ball grooves whose radiuses of curvature are suited for the loaded-ball grooves of the raceway member and which are formed in inner surfaces of two leg portions, respectively; and unloaded-ball circulation means. Mutually opposed J-shaped tube members are used as the unloaded-ball circulation means of a bearing assembly. Attachment covers for the tube members are provided at side sections of the bearing body. Each of the tube members is in a halved structure for easy forming work and assembling work.

Japanese Patent Application Laid-Open No. 2013-29116, for example, discloses a curvilinear motion guide device, as a curvilinear motion rolling guide unit, configured to allow movement of a moving member along a direction in which a curvilinearly extending raceway member extends. The curvilinear motion guide device includes the curvilinearly extending raceway member; the moving member which can move along the extending direction of the raceway member through rolling elements disposed between the moving member and the raceway member; and an infinite circulation passage formed in the moving member and allowing the rolling elements to roll therein. The infinite circulation passage is formed in such a manner as to be surrounded by a loaded-rolling-element rolling surface of the moving member and a rolling-element rolling surface of the raceway member disposed opposite the loaded-rolling-element rolling surface. The infinite circulation passage includes a loaded-rolling-element rolling passage extending curvilinearly along the extending direction of the passage member and a rolling-element return passage formed in the moving member and extending curvilinearly along the loaded-rolling-element rolling passage.

The applicant of the present invention developed a rectilinear motion guide unit in which exterior pipes used to form the return passages are disposed in outer grooves formed in wings, respectively, of a casing, and filed a patent application (see, for example, Japanese Patent Application Laid-Open No. 2013-15189) for the rectilinear motion guide unit. The rectilinear motion guide unit implements a compact, simple slider structure through employment of a unitary construction of the exterior pipes and spacers of end caps and resultant facilitation of assembling work of the slider, and thus is manufactured at low cost. The slider includes a casing composed of a flat plate-like upper section and the wings extending downward from the upper section; a pair of the end caps fixedly attached to end surfaces, respectively, of the casing; a pair of the exterior pipes disposed on outer side surfaces of the wings, respectively, of the casing and provided at the end caps; and a pair of interior pipes fitted in the respective exterior pipes and whose holes define the return passages.

The applicant of the present invention also filed a patent application for a curvilinear motion rolling guide unit in which a slider sliding on a raceway rail extending curvilinearly at a fixed radius of curvature has a well-balanced, small-sized structure and allows use of end caps of the same specifications irrespective of the specifications of the slider (see, for example, Japanese Patent Application Laid-Open No. 2001-241437). The curvilinear motion rolling guide unit is formed such that each of opposite end surfaces of a casing of the slider is in a vertical plane which passes through the center of curvature of the raceway rail and is perpendicular to the raceway rail, irrespective of the length of the casing. Common specifications can be imparted to the end caps in which direction changing passages are formed. Since linear return passages are disposed toward the inside of the casing, the casing does not have a radially excess width, whereby the casing can have a radially well-balanced, small-sized structure.

However, in the above-mentioned swing bearing, since the slider is formed into a rectangular shape, and the return passages are formed linearly, the width of the slider increases accordingly; thus, the swing bearing fails to implement a compact structure. Also, since a lubrication component is not provided, periodic lubrication is required. In the above-mentioned curvilinear motion guide device, the slider is formed into a fan shape; however, since a lubrication component is not provided as in the case of the above swing bearing, periodic lubrication is required.

SUMMARY OF THE INVENTION

The present invention has been conceived to solve the above problem, and an object of the invention is to provide a curvilinear motion rolling guide unit for use in sliding sections of various apparatus, such as curvilinear reciprocating motion mechanisms of semiconductor fabrication apparatus, machine tools, and industrial robots, and having the following features: in forming return passages in which balls, or rolling elements, roll, in contrast to a conventional practice of forming through holes in wings of a casing, arcuate pipe members disposed in undercuts formed on the casing are directly connected to connection pipe portions protruding from direction changing passages of end caps, thereby establishing smooth rolling of the balls and making working on the arcuate casing simple and easy to thereby reduce cutting costs and in turn achieve cost reduction for the entire apparatus; through use of a porous sintered resin member to form the arcuate pipe members, maintenance-free design can be implemented with respect to lubrication; end caps can be diverted from a rectilinear motion rolling guide unit; and by use of arcuate cover members, the arcuate pipe members can be readily fixed to the arcuate casing.

SUBJECT TO BE SOLVED WITH THE PRESENT INVENTION

The present invention provides a curvilinear motion rolling guide unit comprising a raceway rail, an arcuate slider, and a plurality of rolling elements. The raceway rail has first raceway grooves formed in its arcuate inner and outer side surfaces having predetermined radiuses of curvature, respectively. The arcuate slider has second raceway grooves formed in opposition to the respective first raceway grooves and moves on the raceway rail in a relative manner while straddling the raceway rail. The rolling elements roll in infinite circulation passages. Each of the infinite circulation passages is composed of a raceway passage formed between the first raceway groove and the second raceway groove, a return passage provided in the slider and extending along the raceway passage, and direction changing passages provided in the slider and establishing communication between the raceway passage and the return passage.

In the curvilinear motion rolling guide unit, the slider has an arcuate casing, end caps, and arcuate cover members. The arcuate casing has an upper section, and wings extending from inner and outer sides of the upper section along the inner and outer side surfaces of the raceway rail and having the respective second raceway grooves formed therein. The end caps are fixed to respective opposite end surfaces of the casing and have the respective direction changing passages formed therein. The arcuate cover members have respective grooves which extend along longitudinal directions of the wings of the casing and into which respective arcuate pipe members adapted to form the respective return passages are fitted. The cover members are fixed to the casing and/or the end caps.

Preferably, the wings of the casing have longitudinally extending respective undercuts for receiving the respective cover members, and the cylindrical pipe members are disposed at corners of the undercuts, respectively. Preferably, the pipe members are formed of a porous sintered resin member impregnated with lubricant. Preferably, each of the end caps is such that its end surface in contact with the end surface of the casing and its other end surface in contact with an end surface press plate extend in parallel with each other.

Preferably, the end caps in contact with the end surfaces of the casing have connection pipe portions extending from the direction changing passages and protruding toward the casing, and communicating with the return passages of the pipe members, and opposite end portions of the cover members are fitted to the respective connection pipe portions, whereby the cover members are fixed to the end caps. Preferably, the opposite end surfaces of the pipe members abut end surfaces of the connection pipe portions of the end caps, respectively, whereby the direction changing passages and the return passages communicate with each other. Preferably, fitting grooves formed at opposite ends of the grooves of the cover members are fitted to the respective connection pipe portions formed in wings of the end caps, whereby the cover members are fixed to the casing in position.

Preferably, the inner cover member disposed at the wing of the casing is held between the end caps as a result of the end caps being fixed to the opposite end surfaces of the casing, thereby being fixed to the casing.

Preferably, at least the outer cover member disposed at the wing of the casing has first hook portions provided respectively at its opposite end portions and extending toward the casing, and the first hook portions are fitted respectively into and engaged with first hook fixation recesses formed in the opposite end surfaces of the casing, whereby the cover member is fixed to the casing in position.

Preferably, at least the outer cover member disposed at the wing of the casing has, at its opposite end portions, second hook portions extending toward the casing and provided at its inclined surface corresponding to an inclined surface of the undercut of the casing and located above the pipe member, and the second hook portions are fitted respectively into and engaged with second hook fixation recesses formed in the opposite end surfaces of the casing, whereby the cover member is fixed to the casing in position.

Preferably, at least the outer cover member disposed at the wing of the casing has, at its opposite end portions, attachment bracket portions each having a through hole corresponding to an end cap fixing threaded hole formed in the casing, and the end caps have respective attachment holes corresponding to the end cap fixing threaded holes; and screws are inserted through the respective attachment holes and the through holes and screwed into the end cap fixation threaded holes, respectively, thereby fixing the end caps to the casing; as a result, the cover member is fixed to the casing in position.

Preferably, at least the outer wing of the casing has intersecting holes which are formed at each of positions located axially apart from each other, to thereby form engagement portions on its wall surface at the positions where the intersecting holes are present; at least the outer cover member disposed at the wing of the casing has hook portions extending toward the casing, having respective barbs, and provided in respective regions located in opposition to the engagement portions; and each of the hook portions is inserted into one of the intersecting holes, and the barbs are engaged with the respective engagement portions, whereby the cover member is fixed to the casing in position. Preferably, in the casing, one of the intersecting holes extends in the longitudinal direction, and the barbs of the hook portions provided in at least the outer cover member are engaged with the longitudinally extending holes, respectively, whereby the cover member is fixed to the casing in position. Preferably, the longitudinally extending holes formed in the casing are pilot holes for the end cap fixing threaded holes formed in the casing for fixing the end caps to the casing.

EFFECT OF THE INVENTION

Since the curvilinear motion rolling guide unit of the present invention is configured as mentioned above, there is no need to cut insertion holes in the wings of the casing for inserting return passage members thereinto in order to form arcuate return passages, respectively. In the curvilinear motion rolling guide unit of the present invention, the arcuate return passages can be formed as follows. In machining the casing, the wings of the casing are undercut. Subsequently, the arcuate pipe members used to form the return passages are disposed at the undercuts, and then the arcuate pipe members are fixed to the casing with the arcuate cover members. Thus, machining is easy and simple, so that costs of machining the casing can be reduced. Also, by means of the pipe members used to form the return passages being disposed at the undercuts formed at outside portions of the wings, the circulation passages for balls, or rolling elements, can be formed easily and simply. Further, the wall thicknesses of the wings can be reduced by the amounts of the undercuts, respectively, thereby contributing to a reduction in the weight of the slider; as a result, a relevant apparatus can be reduced in weight.

Since communication is established between the pipe members and the connection pipe portions protruding from the rear of the end caps toward the casing with no gap formed therebetween, the balls, or rolling elements, smoothly roll in the infinite circulation passages. Also, if the pipe members are formed of a sintered porous resin material impregnated with lubricant, not only is the structure simple, but also maintenance-free design can be established with respect to lubrication. Further, if the end caps to be incorporated into the curvilinear motion rolling guide unit are diverted from a conventional rectilinear motion rolling guide unit, costs can be reduced accordingly.

DETAILED DESCRIPTION OF THE EMBODIMENT

Figure 1:
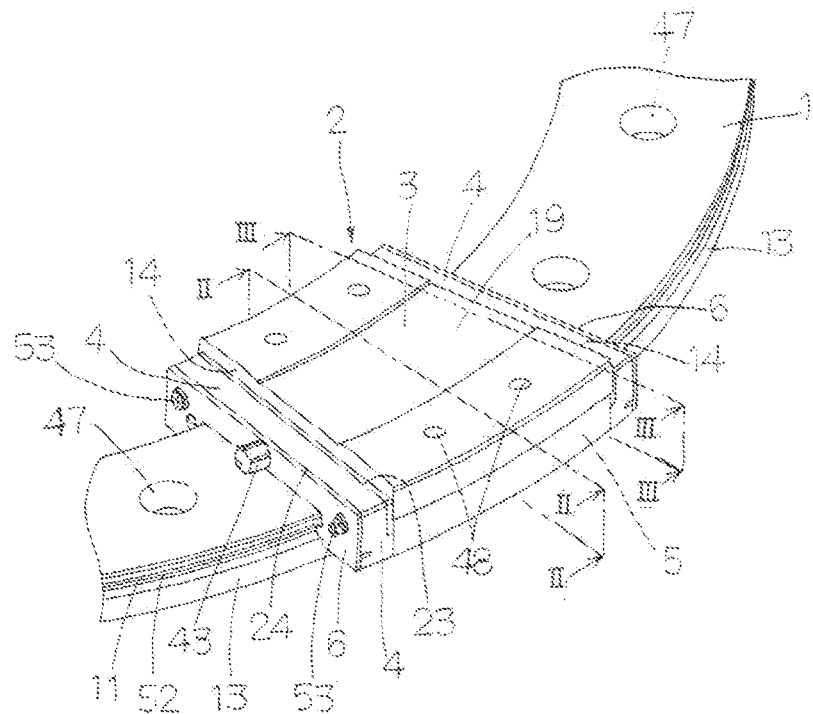
FIG. 1 is a perspective view showing a curvilinear motion rolling guide unit according to a first embodiment of the present invention.
Figure 2:
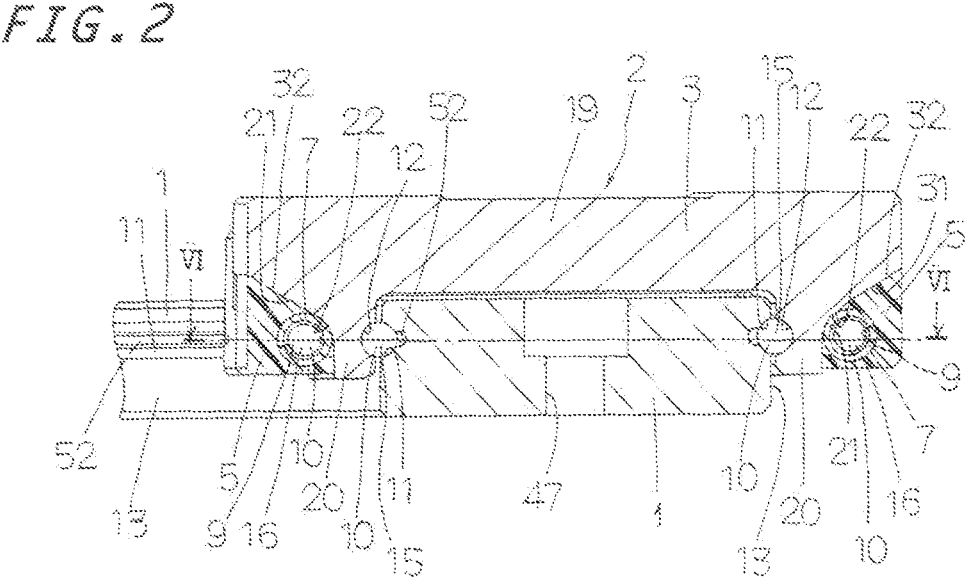
FIG. 2 is a sectional view of the curvilinear motion rolling guide unit taken along line II-II of FIG. 1.
Figure 3:
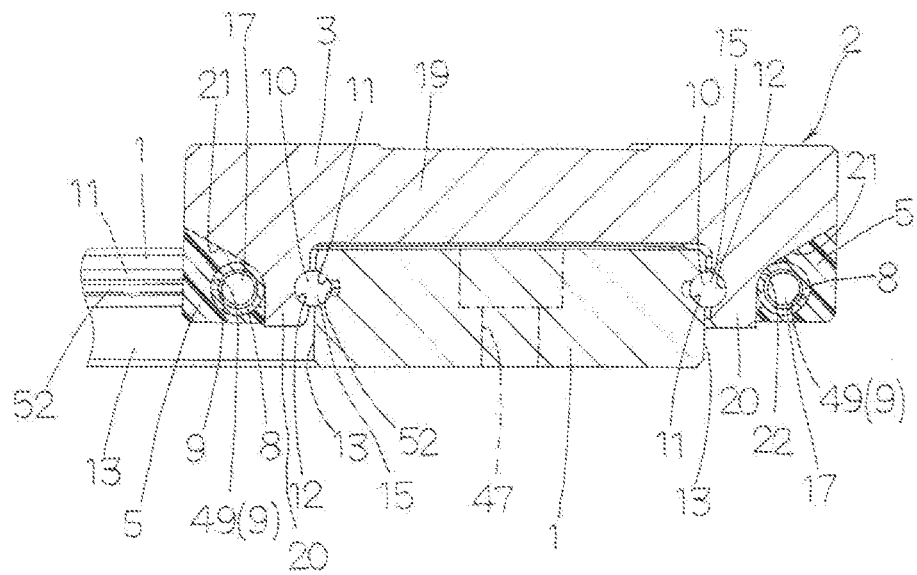
FIG. 3 is a sectional view of the curvilinear motion rolling guide unit taken along line III-III of FIG. 1.
Figure 4:
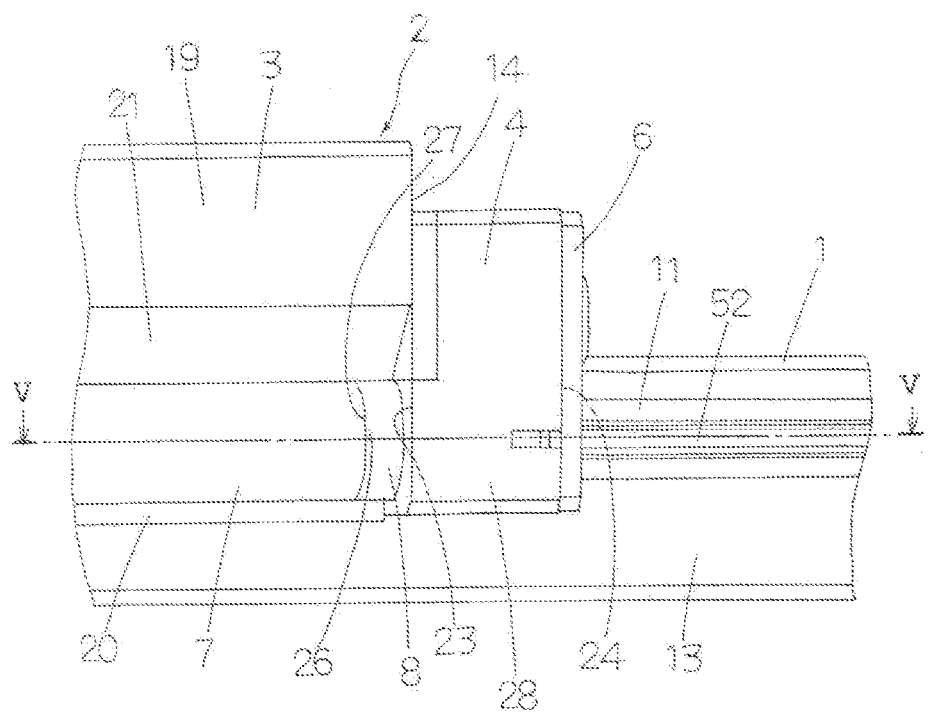
FIG. 4 is a front view showing abutment between a casing and an end cap of a slider as viewed in a state of fixation of the end cap to the casing in the curvilinear motion rolling guide unit with the cover member removed.

A curvilinear motion rolling guide unit according to the present invention is incorporated in relative sliding sections of various apparatus, such as assembling apparatus, industrial robots, precision machinery, and medical equipment for establishing smooth relative movement between components and between equipments. The curvilinear motion rolling guide unit is primarily such that return passages conventionally provided in the form of holes formed in a casing are formed by separate pipe members which are fixed to a slider by cover members, respectively. Embodiments of the curvilinear motion rolling guide unit according to the present invention will next be described with reference to the drawings.

First, with reference to FIGS. 1 to 7, the basic configuration of the curvilinear motion rolling guide unit according to a first embodiment of the present invention will be described. The curvilinear motion rolling guide unit according to the present invention is employed, for example, between members which move relatively to each other, such as between a bed and a table, and includes a raceway rail 1 having an arcuate shape, such as an annular shape or an arc (semicircular) shape, and a slider 2 which straddles the raceway rail 1 and is freely slidable. In the case of an annular raceway rail 1, if the raceway rail 1 is of a split type, the slider 2 can be fitted onto the raceway rail 1 through insertion from the end of a split segment of the split raceway rail 1, whereby the slider 2 can be readily assembled to the raceway rail 1 in a straddling manner. The raceway rail 1 can be formed into an annular shape having, for example, an outside diameter of 300 mm, an inside diameter of 240 mm, and a width of 30 mm. The slider 2 is formed into an arcuate shape in accordance with the longitudinal shape of the raceway rail 1. The raceway rail 1 has four mounting holes 47 formed in its upper surface for mounting the raceway rail 1 to a bed, a machine pedestal, or the like. The curvilinear motion rolling guide unit includes the raceway rail 1 having raceway grooves 11 (first raceway grooves) formed in arcuate inner and outer side surfaces 13 having predetermined radiuses of curvature, respectively; an arcuate slider 2 having raceway grooves 12 (second raceway grooves) formed in opposition to the respective raceway grooves 11 and moving on the raceway rail 1 in a relative manner while straddling the raceway rail 1; and a plurality of rolling elements (balls in the present embodiment) 10 rolling in infinite circulation passages 18 each being composed of a raceway passage 15 formed between the raceway groove 11 and the raceway groove 12, a return passage 16 provided in the slider 2 and extending along the raceway passage 15, and direction changing passages 17 provided in the slider 2 and establishing communication between the raceway passage 15 and the return passage 16. The slider 2 has substantially a fan shape. The curvilinear motion rolling guide unit has a sectional height of 17 mm as measured in a state in which the slider 2 straddles the raceway rail 1. Each of the rolling elements 10 incorporated in the slider 2 has a diameter of, for example, 3 mm. In the curvilinear motion rolling guide unit, since the slider 2 is not detached from the raceway rail 1, the rolling elements 10 do not come out from the slider 2, thereby eliminating need to provide means for holding the rolling elements 10.

The curvilinear motion rolling guide unit, particularly, the slider 2 is characterized by having an arcuate casing 3 which has an upper section 19, and inner and outer wings 20 extending from inner and outer sides of the upper section 19 along the inner and outer side surfaces 13 of the raceway rail 1 and having the respective raceway grooves 12 formed therein; end caps 4 fixed to respective opposite end surfaces 14 of the casing 3 and having the respective direction changing passages 17 formed therein; and arcuate cover members 5 having respective grooves 9 which have circular surfaces, respectively, and extend along longitudinal directions of the inner and outer wings 20 of the casing 3 and into which respective arcuate pipe members 7 adapted to form the respective return passages 16 are fitted. Since the end caps 4 are formed of a synthetic resin, in assembling the end caps 4 to the raceway rail 1, the end caps 4 are elastically deformed to thereby be assembled to the raceway rail 1 in a straddling manner. The casing 3 has mounting threaded holes 48 formed in its upper section 19 for mounting a counter member to the casing 3. Also, in the curvilinear motion rolling guide unit of the present embodiment, end-surface press plates 6 are disposed on outer end surfaces 24 of the end caps 4, respectively. Each of the cover members 5 has a substantially triangular sectional shape having the circular groove 9 which covers the pipe member 7, has opposite edge portions 56 which partially define the groove 9, and can fix the pipe member 7 fitted into the groove 9 at a predetermined position. Also, a grease nipple 43 for supplying lubricant (lubrication oil) to the balls 10 is attached to the slider 2 in such a manner as to protrude from a lubricant supply hole formed in the outer surface of the end-surface press plate 6. Lubricant supplied from the grease nipple 43 passes through an oil hole and an oil groove (not shown) provided in the end cap 4, thereby being supplied to the balls 10.

Figure 5:
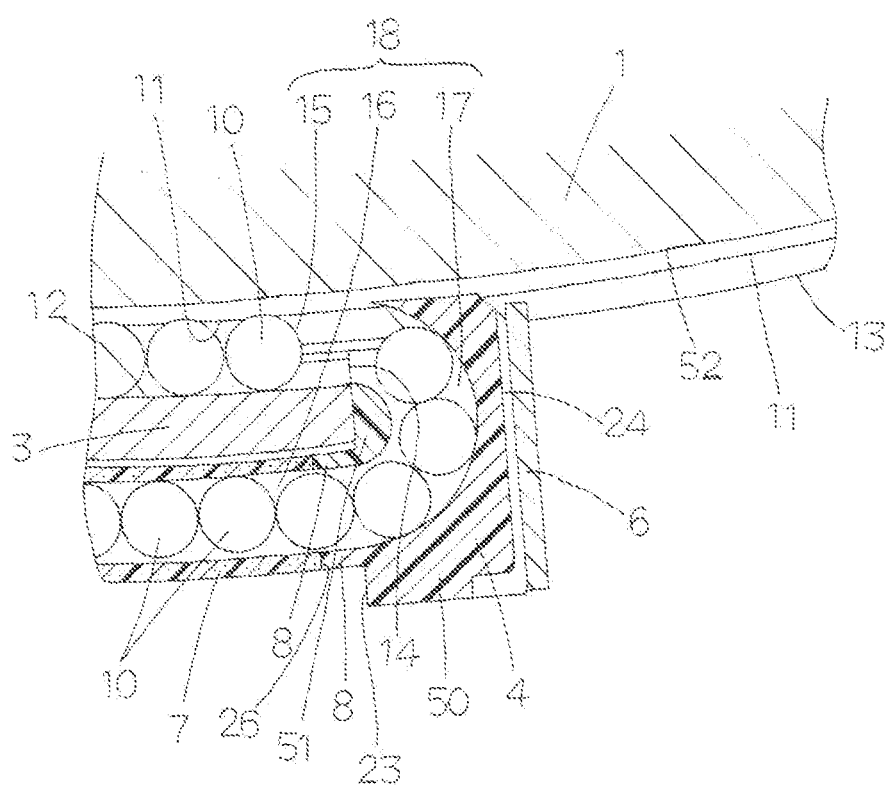
FIG. 5 is a sectional view taken along the V-V of FIG. 4, showing a communication structure between a direction changing passage formed in the end cap and a pipe member used to form a return passage and disposed in the casing.
Figure 6:
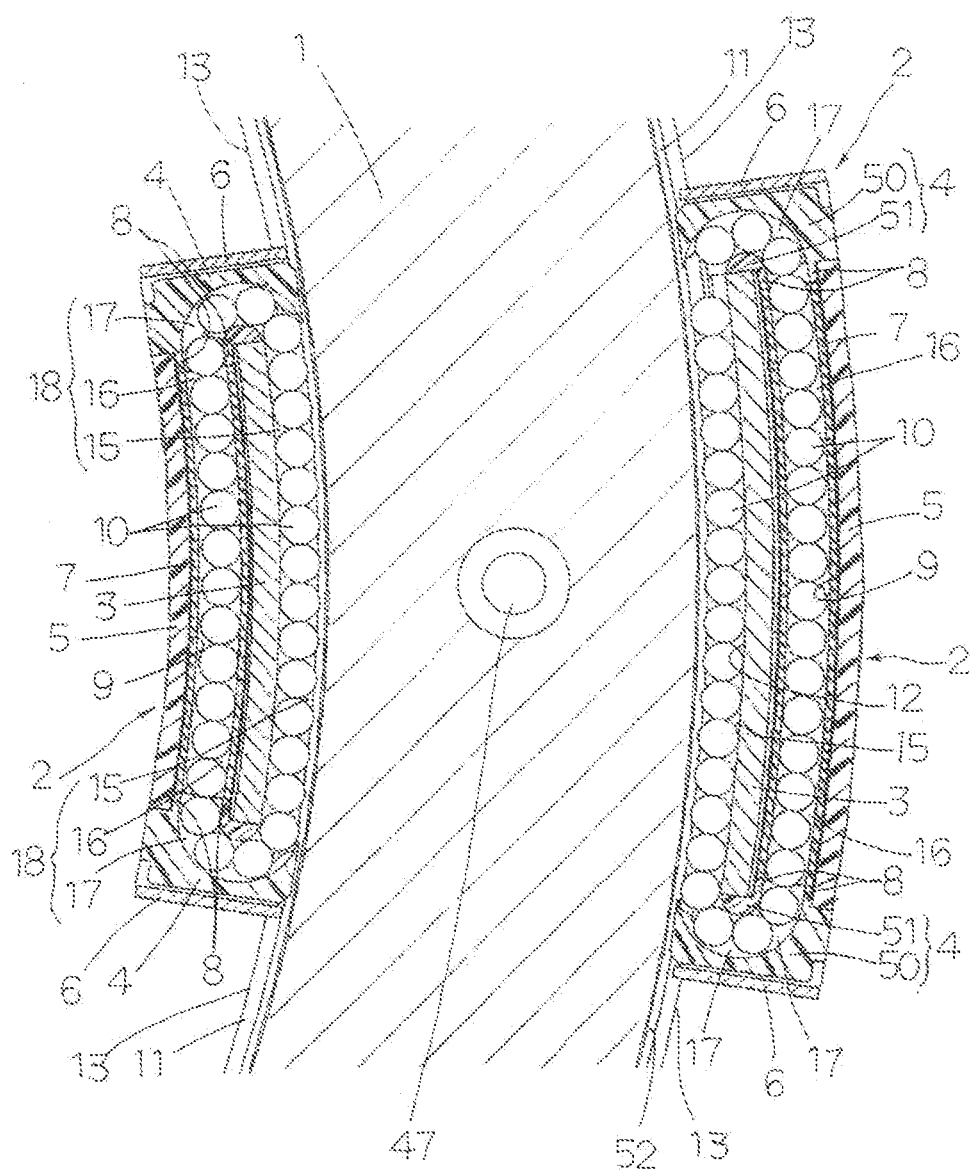
FIG. 6 is a sectional view taken along the VI-VI of FIG. 2, showing circulation passages formed in the slider straddling a raceway rail in the curvilinear motion rolling guide unit.

In the curvilinear motion rolling guide unit, the inner and outer wings 20 of the casing 3 have undercuts 21 extending in the longitudinal direction and at which the cover members 5 equipped with the pipe members 7 are disposed, respectively, and the cylindrical pipe members 7 are disposed at corner portions 22 of the undercuts 21, respectively. Each of the cover members 5 has the groove 9 formed therein over the entire length thereof in the longitudinal direction; the pipe member 7 adapted to form the return passage 16 is fixedly fitted into the groove 9; and the groove 9 has, at its opposite end portions, fitting grooves 49 to be fitted to respective connection pipe portions 8 of the end caps 4. Certain gaps are provided between the pipe members 7 and the corner portions 22 of the undercuts 21, respectively, so that the pipe members 7 can be positionally adjusted to be aligned with the connection pipe portions 8 provided at the end caps 4. Particularly, as shown in FIG. 5, each of the end caps 4 is composed of an end cap body 50 and a spacer 51 formed on an end surface 23 side of the end cap body 50 and fitted into the fitting groove 49. The connection pipe portions 8 provided at the end caps 4 are formed such that semicylindrical portions formed in the end cap bodies 50 and semicylindrical portions formed in the spacers 51 mate with each other into cylindrical shapes, respectively. The connection pipe portions 8 are formed such that the semicylindrical portions of the end cap bodies 50 and the semicylindrical portions of the spacers 51 come into contact with each other into cylindrical portions, respectively, and the cylindrical portions are fitted into the fitting grooves 49, respectively, of the cover members 5.

The end caps 4 can be diverted from a conventional rectilinear motion rolling guide unit and is such that the end surfaces 23 in contact with the end surfaces 14 of the casing 3 and the outer end surfaces 24 in contact with the end-surface press plates 6 extend respectively in parallel with each other. In other words, the end caps 4 can be diverted from the rectilinear motion rolling guide unit; in this case, the connection pipe portions 8 are formed such that end surfaces 27 thereof are in close contact with end surfaces 26 of the pipe members 7, respectively. That is, the opposite end surfaces 26 of the pipe members 5 abut entirely against the end surfaces 27 of the connection pipe portions 8, respectively, whereby the direction changing passages 17 and the return passages 16 communicate respectively with each other in such a manner as to form smooth passages.

In the curvilinear motion rolling guide unit, each of the end caps 4 disposed in contact with the end surfaces 14 of the casing 3 has the connection pipe portions 8 protruding from the direction changing passages 17 toward the casing 3 and communicating with the return passages 16 of the pipe members 7. Opposite end portions 25 of the cover members 5 are fitted to the respective connection pipe portions 8, whereby the cover members 5 are fixed to the end caps 4. Also, in the curvilinear motion rolling guide unit, the fitting grooves 49 formed at the opposite ends of the grooves 9 of the cover members 5 are fitted to the respective connection pipe portions 8 formed at wings 28 of the end caps 4, whereby the cover members 5 are fixed to the casing 3 in position.

The pipe members 7 are formed of a porous sintered resin member impregnated with lubricant. The porous sintered resin member impregnated with lubricant is formed of, for example, a fired compact of synthetic resin particles having a high molecular weight in which spaces between synthetic resin particles communicate with one another; i.e., open pores are formed, and the open pores are impregnated with lubricant. The pipe members 7 define the return passages 16, respectively. Since lubricant can be supplied to the rolling elements 10, or balls, which roll in the return passages 16, at all times over a long period of time, there is no need to periodically supply oil to the rolling elements 10, so that maintenance-free design can be provided with respect to lubrication. In the curvilinear motion rolling guide unit, since the grease nipple 43 is provided at the end-surface press plate 6 and the end cap 4, oil can also be supplied as needed.

The inner cover member 5 disposed at the inner wing 20 of the casing 3 is held between the end caps 4 as a result of the end caps 4 being fixed to the opposite end surfaces 14 of the casing 3, thereby being fixed to the casing 3. That is, since the casing 3 is formed into an arcuate shape, the distances between the end caps 4 fixed to the end surfaces 14 of the casing 3 are such that the inner distance is shorter than the outer distance. Accordingly, the inner cover member 5 fixedly held once between the end caps 4 cannot run out to the exterior of the slider 2 and thus can be maintained in a fixed condition.

Figure 7:
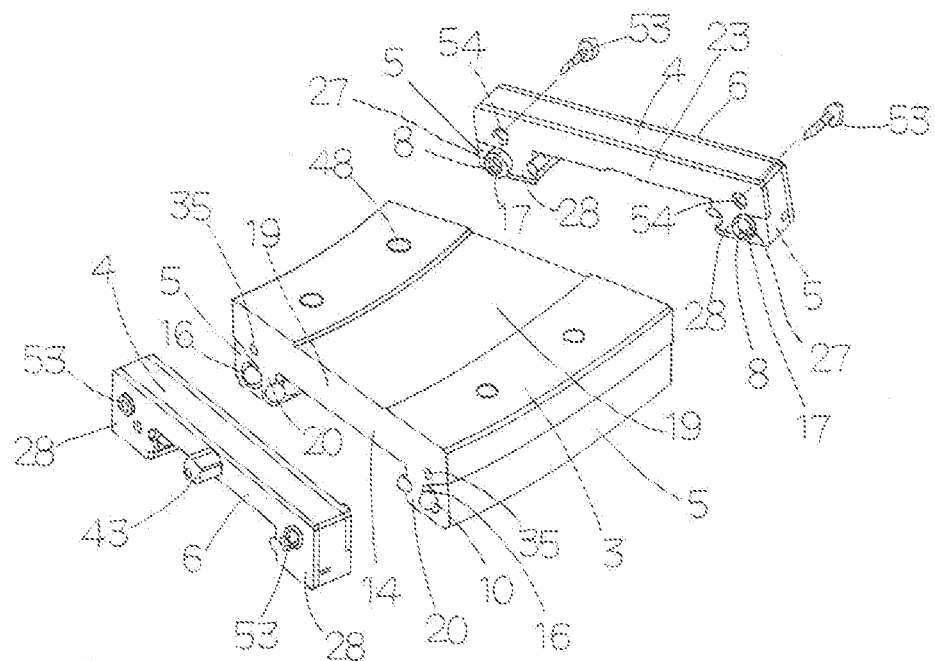
FIG. 7 is an exploded perspective view showing the slider with the casing and the end caps separated from each other in the curvilinear motion rolling guide unit of FIG. 1 in order to show an example of a step of assembling the casing and the end caps together.

FIG. 7 is an explanatory view showing an example of a step of assembling the slider 2. First, the pipe members 7 are engaged with the wings 20 of the casing 3, and then the cover members 5 are disposed. Next, the end caps 4 equipped with the press plates 6 are attached to the respective opposite end surfaces 14 of the casing 3. In the curvilinear motion rolling guide unit, the fitting grooves 49 of the cover members 5 are fixedly fitted to the respective connection pipe portions 8 of the end caps 4, whereby the cover members 5 are fixed to the end caps 4. Thus, end portions of the connection pipe portions 8 are formed such that the outer circumferences of the end surfaces 27 are chamfered to reduce the outside diameters thereof so as to be capable of being fitted into the fitting grooves 49, respectively. By virtue of this, after the end caps 4 are brought into contact with the casing 3, the connection pipe portions 8 can be press-fitted into the fitting grooves 49, respectively; as a result, the cover members 5 are fixedly fitted to the connection pipe portions 8 of the end caps 4, whereby the cover members 5 are fixed to the end caps 4. That is, when the end caps 4 are to be attached to the casing 3, the connection pipe portions 8 of the end caps 4 are fitted into the fitting grooves 49 (not shown) formed in the end portions 25 of the cover members 5 disposed on the casing 3 in such a manner that the end surfaces 26 of the pipe members 7 fixed in the grooves 9 of the cover members 5 abut in an aligned manner against the respective end surfaces 27 of the connection pipe portions 8 of the end caps 4, thereby establishing smooth communication between the return passages 16 and the direction changing passages 17.

Figure 8:
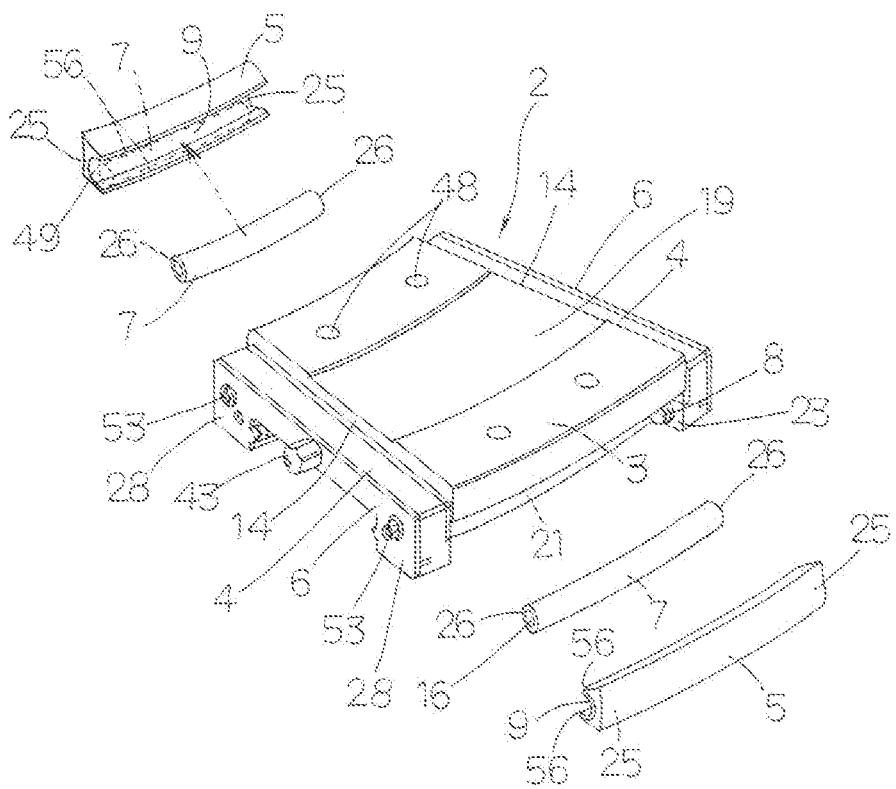
FIG. 8 is an exploded perspective view showing another example of a step of assembling the cover members and the pipe members adapted to form the return passages to an assembled unit of the casing and the end caps in the curvilinear motion rolling guide unit of FIG. 1.
Figure 9:
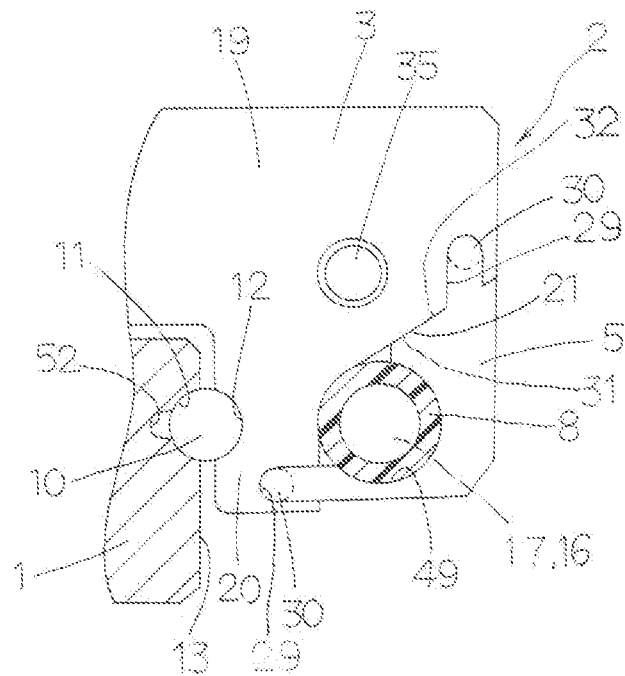
FIG. 9 is an end view showing a state of fixation of the pipe member and the cover member to the casing in the curvilinear motion rolling guide unit of a second embodiment, as viewed from the end surface of the casing.
Figure 10:
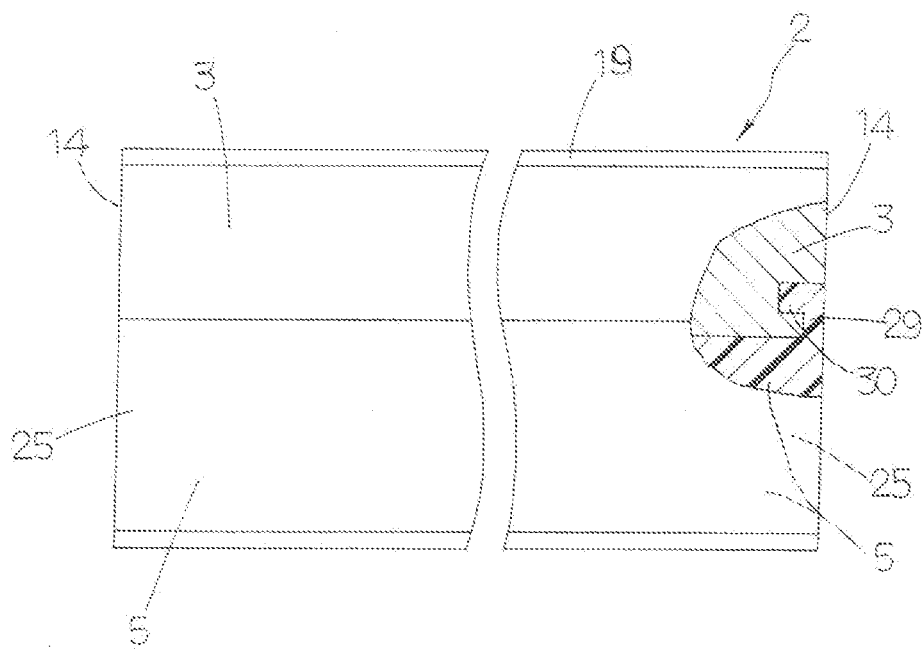
FIG. 10 is a partially sectional front view showing a state of fixation of the cover member to the casing in the curvilinear motion rolling guide unit of FIG. 9.
Figure 11:
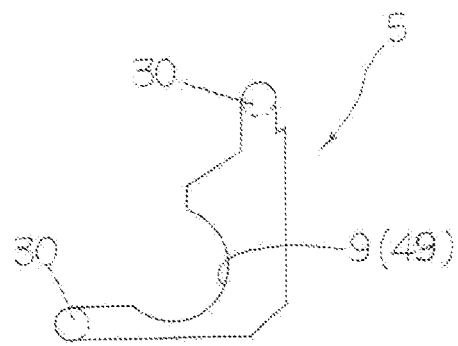
FIG. 11 is an end view showing the cover member used in the curvilinear motion rolling guide unit of FIG. 9.
Figure 12:
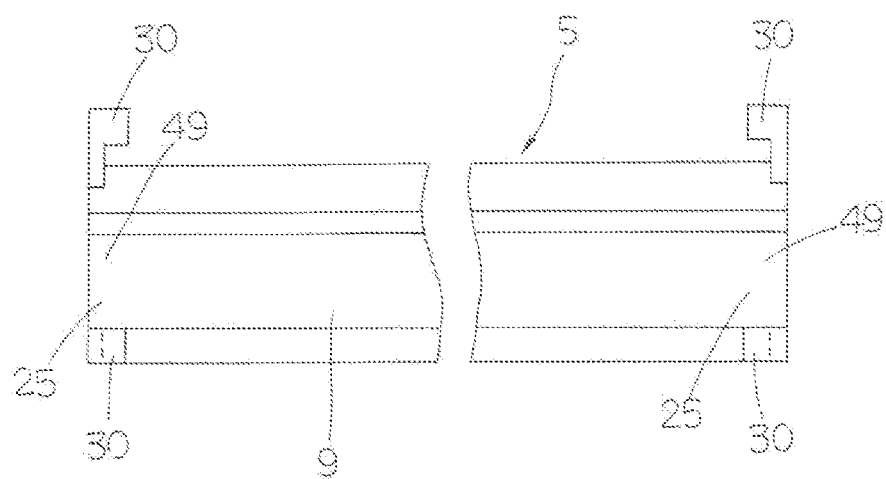
FIG. 12 is a side view showing the cover member used in the curvilinear motion rolling guide unit of FIG. 9.

FIG. 8 is an explanatory view showing another example of a step of assembling the slider 2. First, the end caps 4 equipped with the press plates 6 are temporarily attached to the opposite end surfaces 14 of the casing 3 by temporary screwing. Next, the pipe members 7 and the cover members 5 are disposed at the undercuts 21 of the wings 20 of the casing 3 such that the fitting grooves 49 of the cover members 5 are fixedly fitted to the connection pipe portions 8 of the end caps 4. Finally, the end caps 4 equipped with the press plates 6 are fixed by regular screwing to the opposite end surfaces 14 of the casing 3. In the curvilinear motion rolling guide unit, the grooves 9 of the cover members 5 are formed such that their opposite edge portions 56 have interference over the entire longitudinal lengths thereof in relation to the pipe members 7, and the pipe members 7 are formed shorter than the cover members 5 by the lengths of the connection pipe portions 8. Thus, the pipe members 7 are fixedly fitted into the respective grooves 9 of the cover members 5 with a space having the length of the connection pipe portion 8 being left at each of the opposite end portions 25 of the cover members 5. At this time, since the end caps 4 are temporarily attached to the casing 3 by temporary screwing, the length between the end caps 4 is expanded beforehand longer than the inner lengths of the cover members 5. Then, while the cover members 5 into which the respective pipe members 7 are fixedly fitted are disposed at the respective undercuts 21 of the slider 2 in which the end caps 4 are temporarily attached by temporary screwing to the casing 3, the fitting grooves 49 of the cover members 5 are fixedly fitted to the connection pipe portions 8 of the end caps 4. Next, the end caps 4 are attached to the casing 3 by regular screwing, whereby the cover members 5 can be fixed in position between the end caps 4.

While being fixed to the connection pipe portions 8 of the end caps 4, the cover members 5 can be fixed directly to the casing 3, or the cover members 5 can be partially held between the casing 3 and the end caps 4 so as to be fixed. In this connection, there will be described an example of assembling the cover members 5 to the slider 2. First, with reference to FIGS. 9 to 12, a second embodiment of the curvilinear motion rolling guide unit according to the present invention will be described. In the curvilinear motion rolling guide unit, the cover members 5 disposed at the inner and outer wings 20 of the casing 3 have first hook portions 30 provided at the opposite end portions 25 and extending toward the casing 3, respectively. The first hook portions 30 are fitted into and engaged with first hook fixation recesses 29 formed in the opposite end surfaces 14, respectively, of the casing 3, whereby the cover members 5 are fixed to the casing 3 in position. Although unillustrated, in the case where the inner cover member 5 is not fixed by means of being held between the opposite end caps 4 due to a short length of the slider 2 or a large diameter of curvature of the arc of the slider 2, the inner cover member 5 can have a structure similar to that of the outer cover member 5. One of the first hook portions 30 is located at an upper portion of an inclined surface 31 of the undercut of the casing 3, and the other one of the first hook portions 30 is located at a lower portion of the wing 20 of the casing 3. As a result of the end caps 4 being fixed to the casing 3, the first hook portions 30 of the cover members 5 are held between the end surfaces 14 of the casing 3 and the end surfaces 23 of the end caps 4, whereby the cover members 5 are fixed to the slider 2. The side surfaces of the casing 3 and the side surfaces of the cover members 5 are flush with each other, whereas the lower surfaces of the cover members 5 are located slightly above the lower surfaces of the wings 20 of the casing 3. The end surfaces of the cover members 5 are flush with the respective end surfaces 14 of the casing 3, and the cover members 5 are held between and in close contact with the end surfaces 23 of the end caps 4 and the end surfaces 14 of the casing 3. The grooves 9 formed in the cover members 5 have semicircular cross sections, respectively, so as to allow the pipe members 7 to be disposed in close contact therewith.

Figure 13:
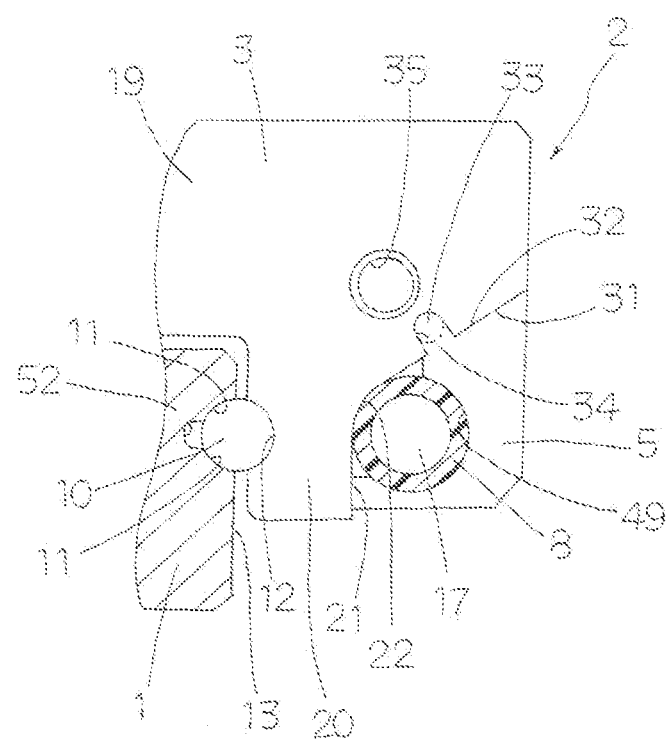
FIG. 13 is an end view showing a state of fixation of the pipe member and the cover member to the casing in the curvilinear motion rolling guide unit of a third embodiment, as viewed from the end surface of the casing.
Figure 14:
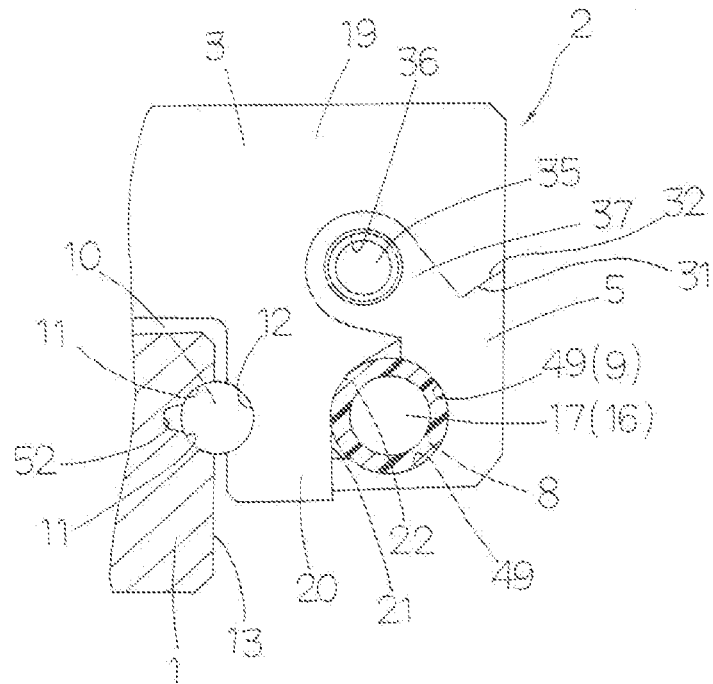
FIG. 14 is an end view showing a state of fixation of the pipe member and the cover member to the casing in the curvilinear motion rolling guide unit of a fourth embodiment, as viewed from the end surface of the casing.
Figure 15:
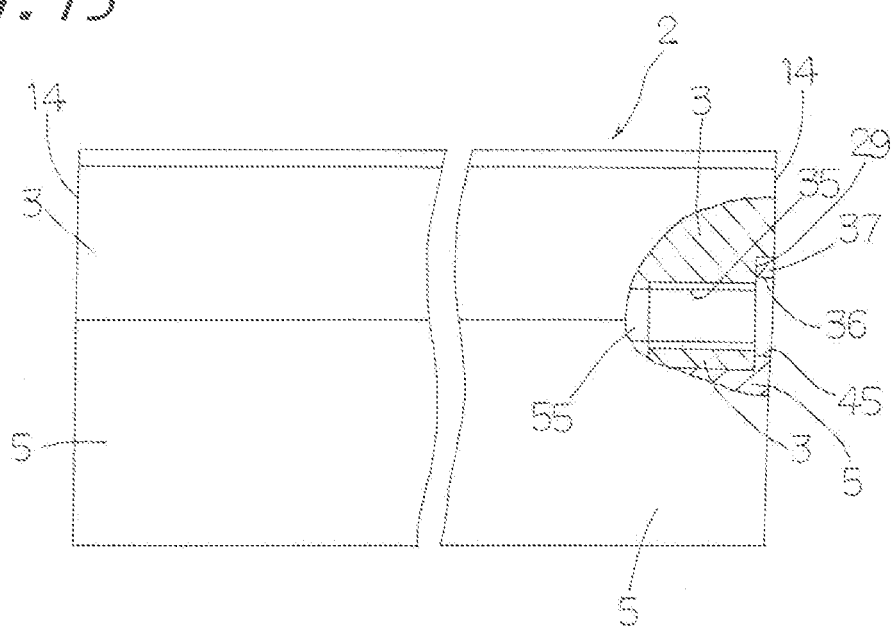
FIG. 15 is a partially sectional plan view showing a state of fixation of the cover member to the casing in the curvilinear motion rolling guide unit of FIG. 14.
Figure 16:
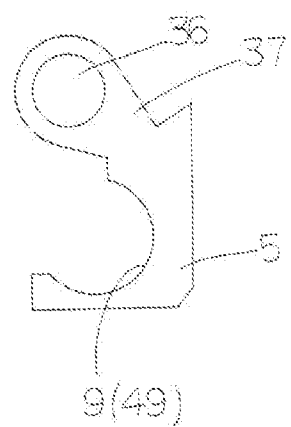
FIG. 16 is an end view showing the cover member used in the curvilinear motion rolling guide unit of FIG. 14.
Figure 17:
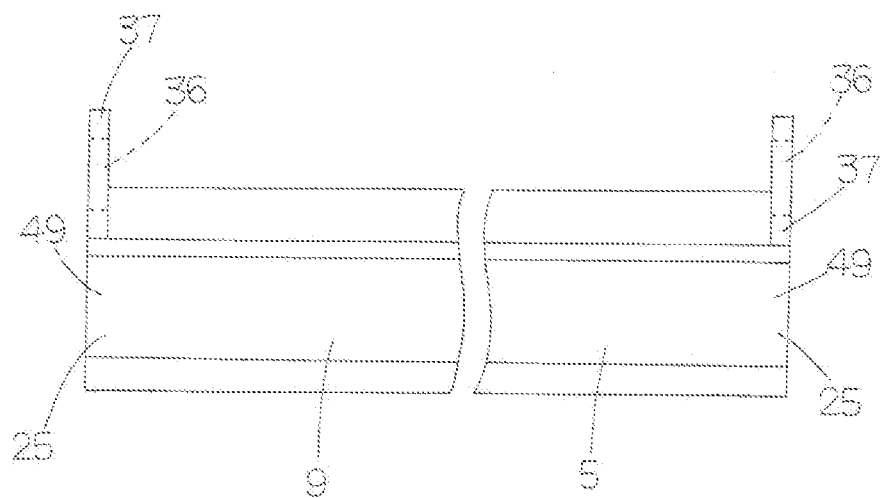
FIG. 17 is a side view showing the cover member used in the curvilinear motion rolling guide unit of FIG. 14.
Figure 18:
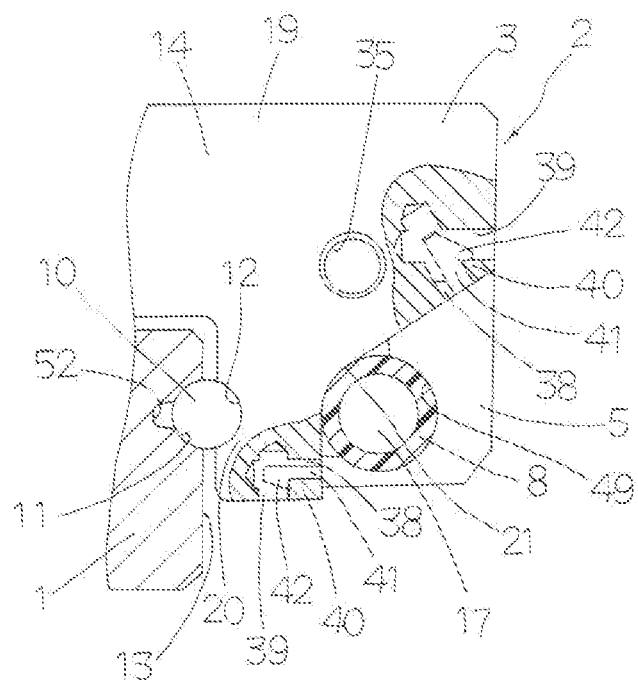
FIG. 18 is an end view showing a state of fixation of the pipe member and the cover member to the casing in the curvilinear motion rolling guide unit of a fifth embodiment, as viewed from the end surface of the casing.
Figure 19:
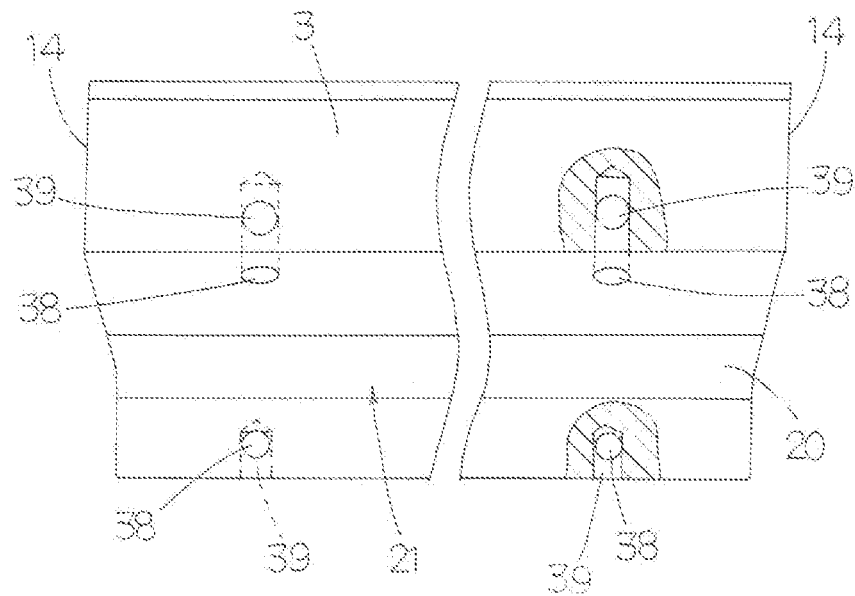
FIG. 19 is a partially sectional side view of the casing showing a state of fixation of the cover member to the casing in the curvilinear motion rolling guide unit of FIG. 18.
Figure 20:
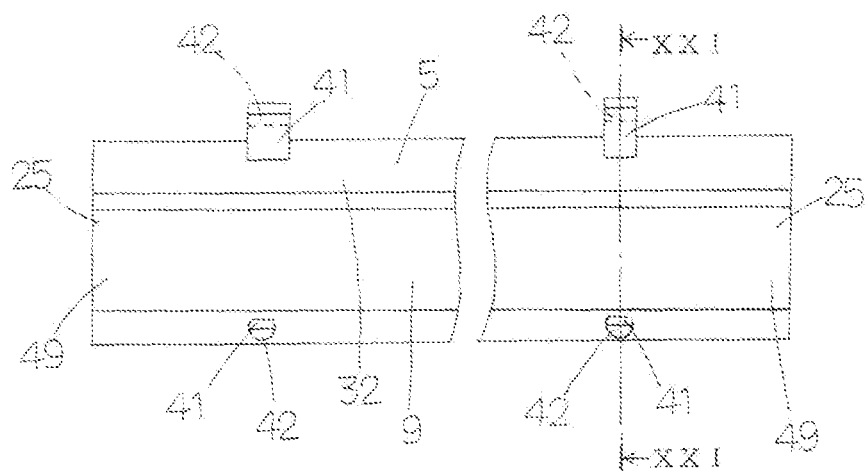
FIG. 20 is a side view showing the cover member used in the curvilinear motion rolling guide unit of FIG. 18.
Figure 21:
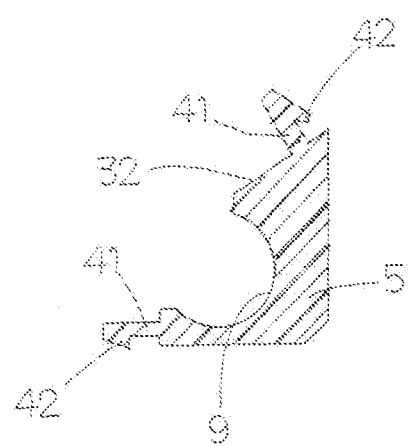
FIG. 21 is a sectional view of the cover member used in the curvilinear motion rolling unit taken along line XXI-XXI of FIG. 20.
Figure 22:
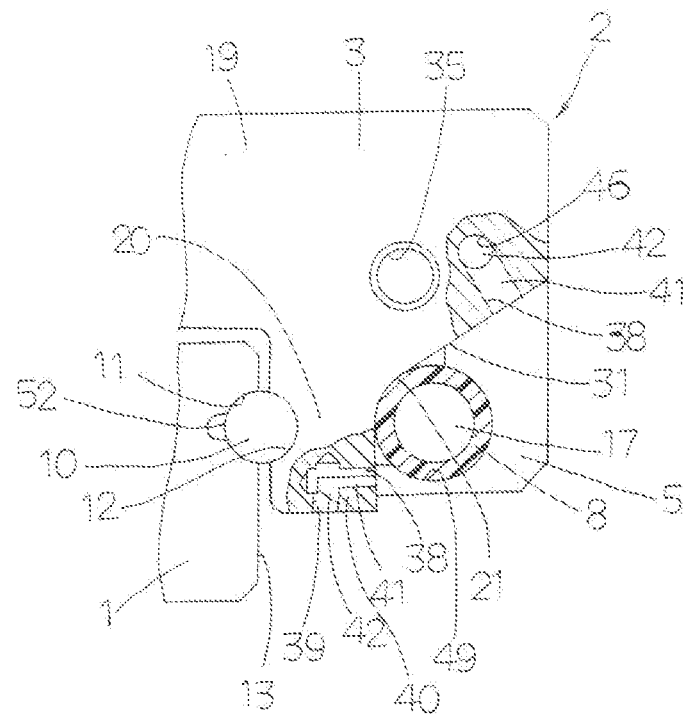
FIG. 22 is an end view showing a state of fixation of the pipe member and the cover member to the casing in the curvilinear motion rolling guide unit of a sixth embodiment, as viewed from the end surface of the casing.
Figure 23:
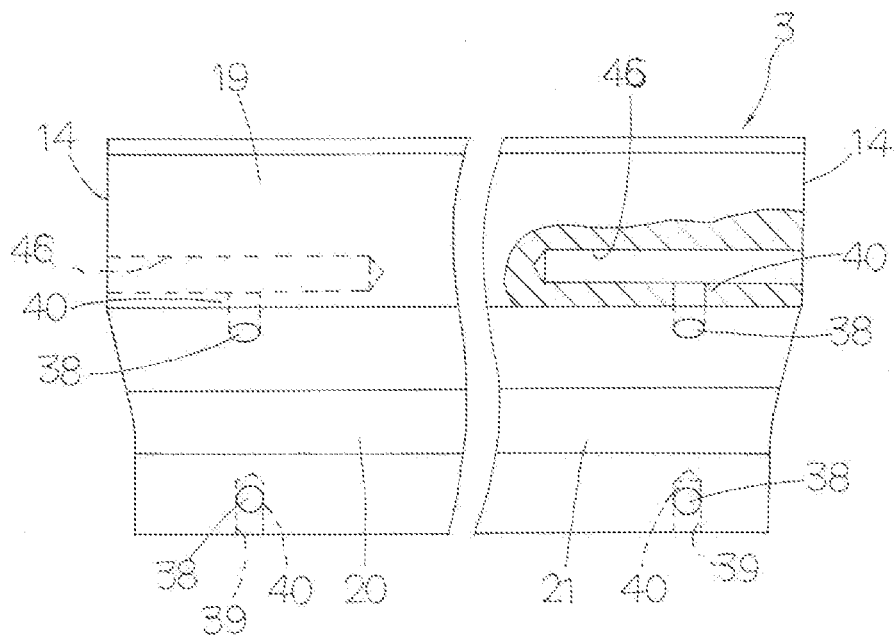
FIG. 23 is a partially sectional side view of the casing showing a region where the cover member is fixed to the casing in the curvilinear motion rolling guide unit of FIG. 22.
Figure 24:
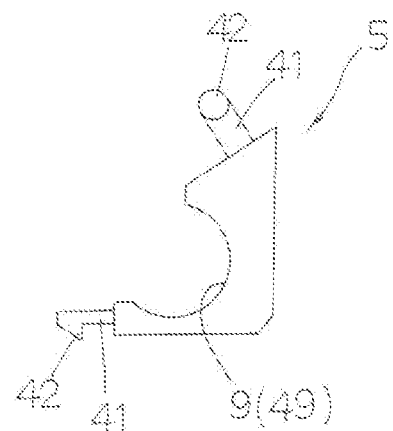
FIG. 24 is an end view showing the cover member used in the curvilinear motion rolling guide unit of FIG. 22.
Figure 25:
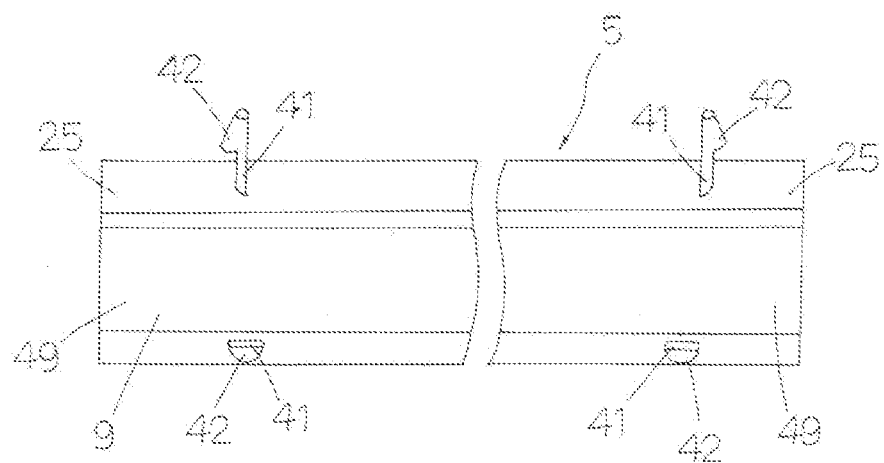
FIG. 25 is a side view showing the cover member used in the curvilinear motion rolling guide unit of FIG. 22.
Figure 26:
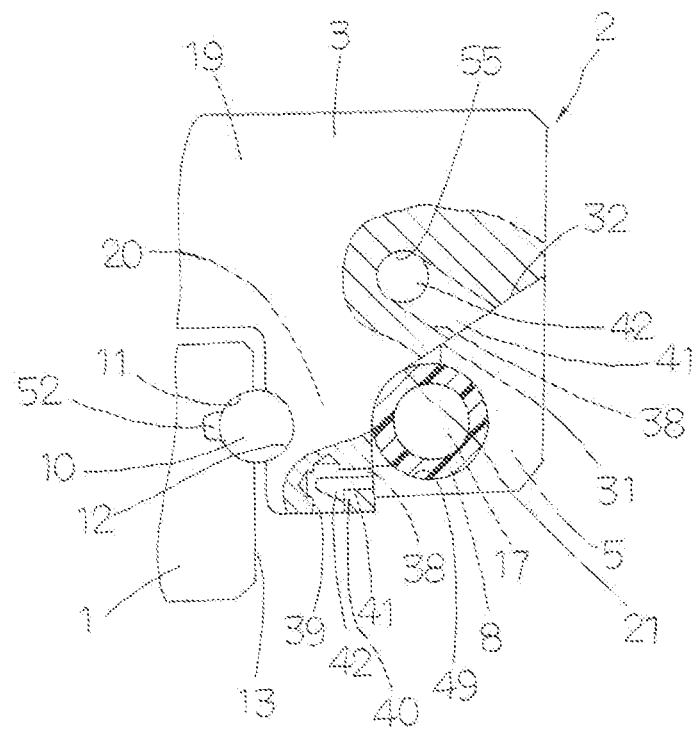
FIG. 26 is an end view showing a state of fixation of the pipe member and the cover member to the casing in the curvilinear motion rolling guide unit of a seventh embodiment, as viewed from the end surface of the casing.
Figure 27:
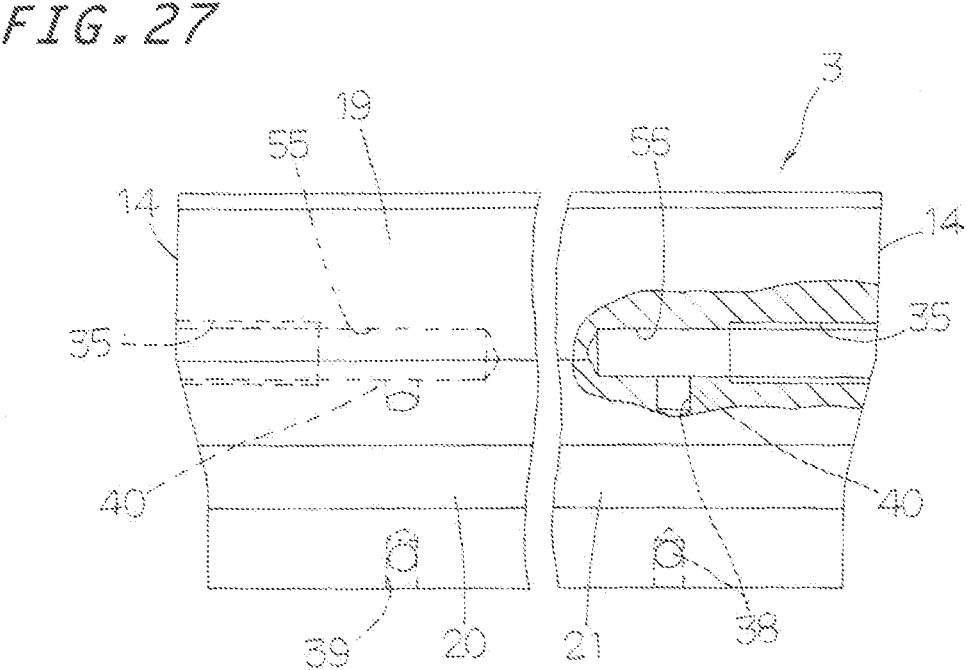
FIG. 27 is a partially sectional side view of the casing showing a state of fixation of the cover member to the casing in the curvilinear motion rolling guide unit of FIG. 26.
Figure 28:
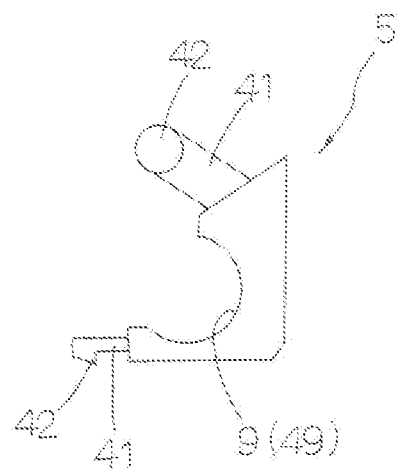
FIG. 28 is an end view showing the cover member used in the curvilinear motion rolling guide unit of FIG. 26.
Figure 29:
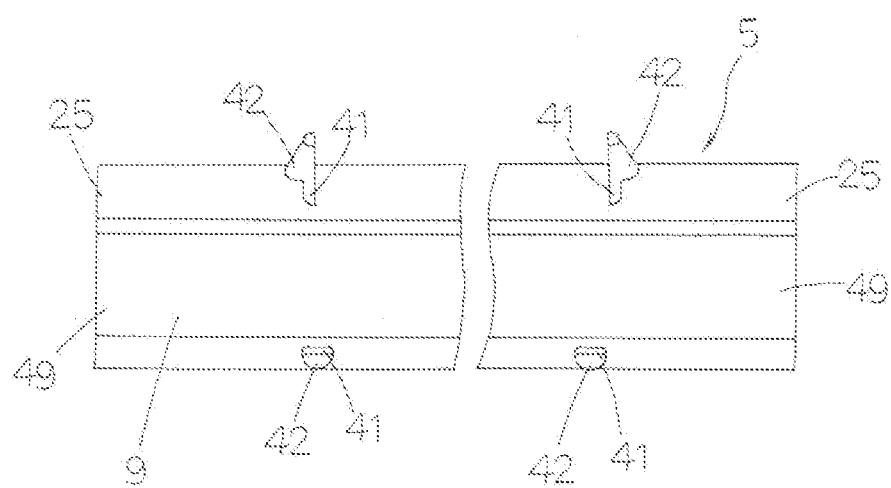
FIG. 29 is a side view showing the cover member used in the curvilinear motion rolling guide unit of FIG. 26.

With reference to FIG. 13, a third embodiment of the curvilinear motion rolling guide unit according to the present invention will be described. The curvilinear motion rolling guide unit is configured similarly to that of the second embodiment except for the positions of second hook portions 33. In the third embodiment, the cover members 5 disposed at the wings 20 of the casing 3 have, at the opposite end portions 25, the second hook portions 33 extending toward the casing 3 and located at intermediate positions of inclined surfaces 32 located above the pipe members 5 and corresponding to the inclined surfaces 31 of the undercuts 21, respectively, of the casing 3. The second hook portions 33 are fitted into and engaged with second hook fixation recesses 34 formed in the opposite end surfaces 14, respectively, of the casing 3, whereby the cover members 5 are fixed to the casing 3 in position. Although unillustrated, in the case where the inner cover member 5 is not fixed by means of being held between the opposite end caps 4 due to a short length of the slider 2 or a large diameter of curvature of the arc of the slider 2, the inner cover member 5 can have a structure similar to that of the outer cover member 5.

With reference to FIGS. 14 to 17, a fourth embodiment of the curvilinear motion rolling guide unit according to the present invention will be described. In the curvilinear motion rolling guide unit, the cover members 5 disposed at the wings 20 of the casing 3 have, at the opposite end portions 25, mounting bracket portions 37 having through holes 36 corresponding to end cap fixing threaded holes 35 formed in the casing 3. The fourth embodiment is configured similarly to the third embodiment except that the mounting bracket portions 37 replace the second hook portions 33. The end caps 4 have mounting holes (not shown) formed therein and corresponding to the end cap fixing threaded holes 35. Screws 53 are inserted through the mounting holes formed in the end caps 4 and through the through holes 36 and are screwed into the end cap fixing threaded holes 35, respectively, whereby the end caps 4 are fixed to the casing 3; as a result, the cover members 5 are fixed to the casing 3 in position. Although unillustrated, in the case where the inner cover member 5 is not fixed by means of being held between the opposite end caps 4 due to a short length of the slider 2 or a large diameter of curvature of the arc of the slider 2, the inner cover member 5 can have a structure similar to that of the outer cover member 5.

With reference to FIGS. 18 to 21, a fifth embodiment of the curvilinear motion rolling guide unit according to the present invention will be described. In the curvilinear motion rolling guide unit, the outer wing 20 of the casing 3 has intersecting holes 38 and 39 which are formed at each of positions located axially apart from each other, to thereby form engagement portions 40 on the wall surface of the outer wing 20 at the positions where the intersecting holes 38 and 39 are present; the outer cover member 5 disposed at the outer wing 20 of the casing 3 has hook portions 41 extending toward the casing 3, having respective barbs 42, and provided in respective regions located in opposition to the engagement portions 40; and each of the hook portions 41 is inserted into one (38) of the intersecting holes 38 and 39 of the casing 3, and the barbs 42 are engaged with the respective engagement portions 40, whereby the outer cover member 5 is fixed to the casing 3 in position. Although unillustrated, in the case where the inner cover member 5 is not fixed by means of being held between the opposite end caps 4 due to a short length of the slider 2 or a large diameter of curvature of the arc of the slider 2, the inner cover member 5 can have a structure similar to that of the outer cover member 5.

With reference to FIGS. 22 to 25, a sixth embodiment of the curvilinear motion rolling guide unit according to the present invention will be described. The sixth embodiment is configured similarly to the fifth embodiment except that one (39) of the intersecting holes 38 and 39 is changed to the longitudinally extending hole 46. In the casing 3, one (46) of the intersecting holes 38 and 46 extends in the longitudinal direction, and the barbs 42 of the hook portions 41 provided in the outer cover member 5 are engaged with the longitudinally extending holes 46, respectively, whereby the outer cover member 5 is fixed to the casing 3 in position. Although unillustrated, in the case where the inner cover member 5 is not fixed by means of being held between the opposite end caps 4 due to a short length of the slider 2 or a large diameter of the arc of the slider 2, the inner cover member 5 can have a structure similar to that of the outer cover member 5.

With reference to FIGS. 26 to 29, a seventh embodiment of the curvilinear motion rolling guide unit according to the present invention will be described. The seventh embodiment is configured similarly to the sixth embodiment except that pilot holes 55 for the end cap fixing threaded holes 35 formed in the casing 3 are utilized as the longitudinally extending holes 46. In the seventh embodiment, the longitudinally extending holes 46 formed in the casing 3 are the pilot holes 55 for the end cap fixing threaded holes 35 formed in the casing 3 for fixing the end caps 4 to the casing 3. Although unillustrated, in the case where the inner cover member 5 is not fixed by means of being held between the opposite end caps 4 due to a short length of the slider 2 or a large diameter of curvature of the arc of the slider 2, the inner cover member 5 can have a structure similar to that of the outer cover member 5.

What is claimed is:
1. A curvilinear motion rolling guide unit comprising:
a raceway rail having first raceway grooves formed in arcuate inner and outer side surfaces having predetermined radiuses of curvature, respectively;
an arcuate slider having second raceway grooves formed in opposition to the respective first raceway grooves and moving on the raceway rail in a relative manner while straddling the raceway rail; and
a plurality of rolling elements rolling in infinite circulation passages each being composed of a raceway passage formed between the first raceway groove and the second raceway groove, a return passage provided in the slider and extending along the raceway passage, and direction changing passages provided in the slider and establishing communication between the raceway passage and the return passage,
wherein the slider has an arcuate casing which has an upper section and wings extending from inner and outer sides of the upper section along the inner and outer side surfaces of the raceway rail and having the respective second raceway grooves formed therein, end caps fixed to respective opposite end surfaces of the casing and having the respective direction changing passages formed therein, and arcuate cover members having respective grooves which extend along longitudinal directions of the wings of the casing and into which respective arcuate pipe members adapted to form the respective return passages are fitted, the cover members are fixed to the casing and/or the end caps, and wherein the end caps in contact with the end surfaces of the casing have connection pipe portions extending from the direction changing passages and protruding toward the casing, and communicating with the return passages of the pipe members, and opposite end portions of the cover members are fitted to the respective connection pipe portions, whereby the cover members are fixed to the end caps.

2. The curvilinear motion rolling guide unit according to claim 1, wherein the opposite end surfaces of the pipe members abut end surfaces of the connection pipe portions of the end caps, respectively, whereby the direction changing passages and the return passages communicate with each other.

3. The curvilinear motion rolling guide unit according to claim 2, wherein fitting grooves formed at opposite ends of the grooves of the cover members are fitted to the respective connection pipe portions formed in wings of the end caps, whereby the cover members are fixed to the casing in position.

4. A curvilinear motion rolling guide unit comprising:
a raceway rail having first raceway grooves formed in arcuate inner and outer side surfaces having predetermined radiuses of curvature, respectively;
an arcuate slider having second raceway grooves formed in opposition to the respective first raceway grooves and moving on the raceway rail in a relative manner while straddling the raceway rail; and
a plurality of rolling elements rolling in infinite circulation passages each being composed of a raceway passage formed between the first raceway groove and the second raceway groove, a return passage provided in the slider and extending along the raceway passage, and direction changing passages provided in the slider and establishing communication between the raceway passage and the return passage,
wherein the slider has an arcuate casing which has an upper section and wings extending from inner and outer sides of the upper section along the inner and outer side surfaces of the raceway rail and having the respective second raceway grooves formed therein, end caps fixed to respective opposite end surfaces of the casing and having the respective direction changing passages formed therein, and arcuate cover members having respective grooves which extend along longitudinal directions of the wings of the casing and into which respective arcuate pipe members adapted to form the respective return passages are fitted,
the cover members are fixed to the casing and/or the end caps, and
wherein at least the outer cover member disposed at the wing of the casing has first hook portions provided respectively at its opposite end portions and extending toward the casing, and the first hook portions are fitted respectively into and engaged with first hook fixation recesses formed in the opposite end surfaces of the casing, whereby the cover member is fixed to the casing in position.

5. A curvilinear motion rolling guide unit comprising,
a raceway rail having first raceway grooves formed in arcuate inner and outer side surfaces having predetermined radiuses of curvature, respectively;
an arcuate slider having second raceway grooves formed in opposition to the respective first raceway grooves and moving on the raceway rail in a relative manner while straddling the raceway rail; and
a plurality of rolling elements rolling in infinite circulation passages each being composed of a raceway passage formed between the first raceway groove and the second raceway groove, a return passage provided in the slider and extending along the raceway passage, and direction changing passages provided in the slider and establishing communication between the raceway passage and the return passage,
wherein the slider has an arcuate casing which has an upper section and wings extending from inner and outer sides of the upper section along the inner and outer side surfaces of the raceway rail and having the respective second raceway grooves formed therein, end caps fixed to respective opposite end surfaces of the casing and having the respective direction changing passages formed therein, and arcuate cover members having respective grooves which extend along longitudinal directions of the wings of the casing and into which respective arcuate pipe members adapted to form the respective return passages are fitted,
the cover members are fixed to the casing and/or the end caps, and
wherein at least the outer cover member disposed at the wing of the casing has, at its opposite end portions, hook portions extending toward the casing and provided at its inclined surface corresponding to an inclined surface of the undercut of the casing and located above the pipe member, and the hook portions are fitted respectively into and engaged with a second hook fixation recesses formed in the opposite end surfaces of the casing, whereby the cover member is fixed to the casing in position.

6. A curvilinear motion rolling guide unit comprising:
a raceway rail having first raceway grooves formed in arcuate inner and outer side surfaces having predetermined radiuses of curvature, respectively;
an arcuate slider having second raceway grooves formed in opposition to the respective first raceway grooves and moving on the raceway rail in a relative manner while straddling the raceway rail; and
a plurality of rolling elements rolling in infinite circulation passages each being composed of a raceway passage formed between the first raceway groove and the second raceway groove, a return passage provided in the slider and extending along the raceway passage, and direction changing passages provided in the slider and establishing communication between the raceway passage and the return passage,
wherein the slider has an arcuate casing which has an upper section and wings extending from inner and outer sides of the upper section along the inner and outer side surfaces of the raceway rail and having the respective second raceway grooves formed therein, end caps fixed to respective opposite end surfaces of the casing and having the respective direction changing passages formed therein, and arcuate cover members having respective grooves which extend along longitudinal directions of the wings of the casing and into which respective arcuate pipe members adapted to form the respective return passages are fitted,
the cover members are fixed to the casing and/or the end caps, and
wherein at least the outer cover member disposed at the wing of the casing has, at its opposite end portions, attachment bracket portions each having a through hole corresponding to an end cap fixing threaded hole formed in the casing, and the end caps have respective attachment holes corresponding to the end cap fixing threaded holes, and screws are inserted through the respective attachment holes and the through holes and screwed into the end cap fixation threaded holes, respectively, thereby fixing the end caps to the casing; as a result, the cover member is fixed to the casing in position.

7. A curvilinear motion rolling guide unit comprising:
a raceway rail having first raceway grooves formed in arcuate inner and outer side surfaces having predetermined radiuses of curvature, respectively;
an arcuate slider having second raceway grooves formed in opposition to the respective first raceway grooves and moving on the raceway rail in a relative manner while straddling the raceway rail; and
a plurality of rolling elements rolling in infinite circulation passages each being composed of a raceway passage formed between the first raceway groove and the second raceway groove, a return passage provided in the slider and extending along the raceway passage, and direction changing passages provided in the slider and establishing communication between the raceway passage and the return passage,
wherein the slider has an arcuate casing which has an upper section and wings extending from inner and outer sides of the upper section along the inner and outer side surfaces of the raceway rail and having the respective second raceway grooves formed therein, end caps fixed to respective opposite end surfaces of the casing and having the respective direction changing passages formed therein, and arcuate cover members having respective grooves which extend along longitudinal directions of the wings of the casing and into which respective arcuate pipe members adapted to form the respective return passages are fitted,
the cover members are fixed to the casing and/or the end caps,
wherein at least the outer wing of the casing has intersecting holes which are formed at each of positions located axially apart from each other, to thereby form engagement portions on its wall surface at the positions where the intersecting holes are present, at least the outer cover member disposed at the wing of the casing has hook portions extending toward the casing, having respective barbs, and provided in respective regions located in opposition to the engagement portions, and each of the hook portions is inserted into one of the intersecting holes, and the barbs are engaged with the respective engagement portions, whereby the cover member is fixed to the casing in position.

8. The curvilinear motion rolling guide unit according to claim 7, wherein in the casing, one of the intersecting holes extends in the longitudinal direction, and the barbs of the hook portions provided in at least the outer cover member are engaged with the longitudinally extending holes, respectively, whereby the cover member is fixed to the casing in position.

9. The curvilinear motion rolling guide unit according to claim 8, wherein the longitudinally extending holes formed in the casing are pilot holes for the end cap fixing threaded holes formed in the casing for fixing the end caps to the casing.

* * * * *